W. HADDOCK.
CRANK-PINS FOR CUT-NAIL MACHINES.
No. 172,428. Patented Jan. 18, 1876.
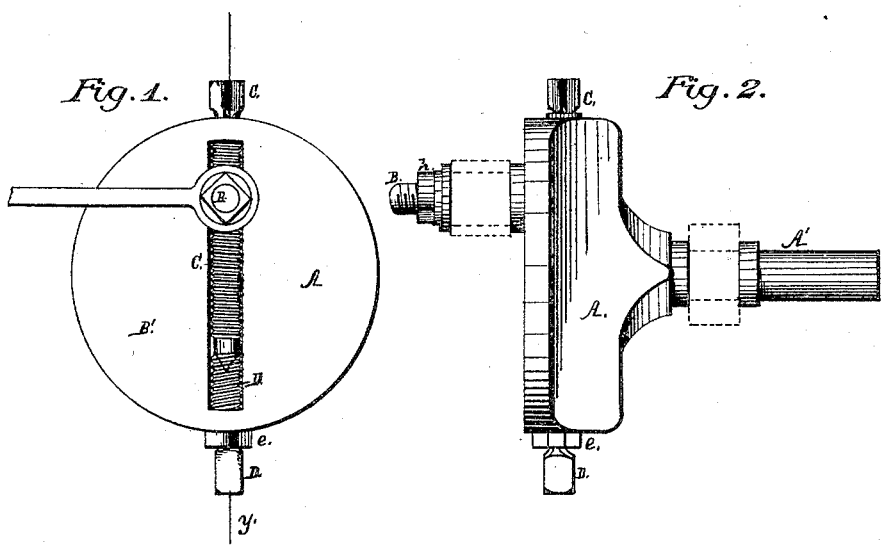
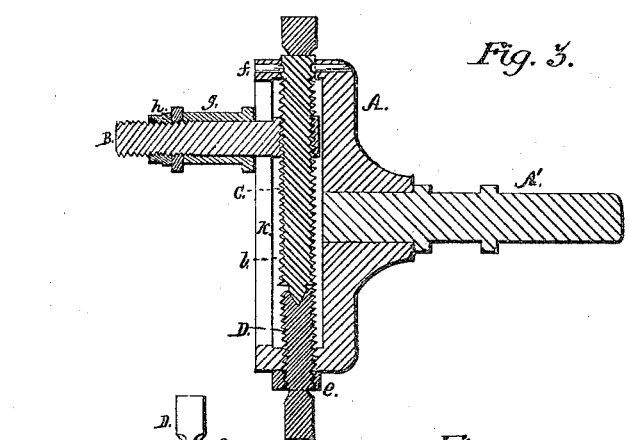
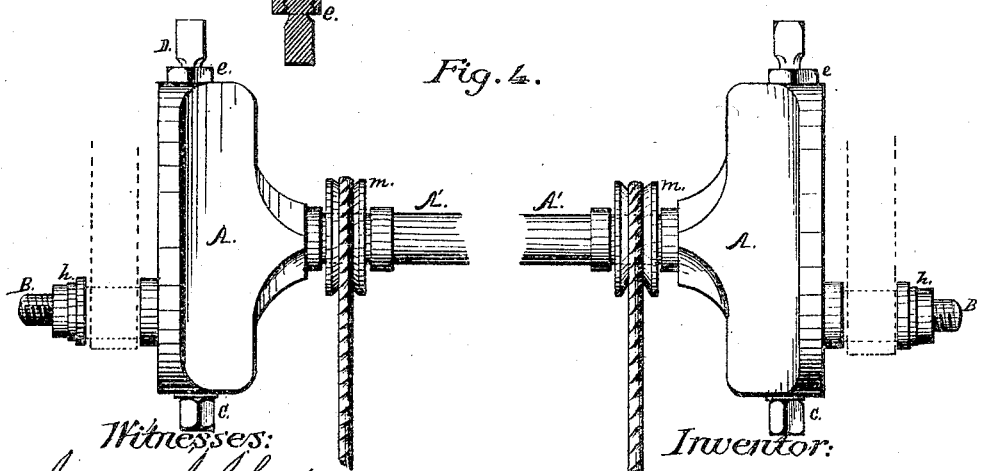

UNITED STATES PATENT OFFICE.

WORCESTER HADDOCK, OF PITTSBURG, PENNSYLVANIA, ASSIGNOR, BY MESNE ASSIGNMEMTS, TO AURORA IRON AND NAIL COMPANY, OF AURORA, INDIANA.

IMPROVEMENT IN CRANK-PINS FOR CUT-NAIL MACHINES.

Specification forming part of Letters Patent No. 172,428, dated January 18, 1876; application filed September 13, 1875.

CASE B.

*To all whom it may concern:*

Be it known that I, WORCESTER HADDOCK, of Pittsburg, in the county of Allegheny and State of Pennsylvania, have invented a new and useful Improvement in Crank-Pin for Cut-Nail Machines; and I do hereby declare that the following is a full and exact description thereof, reference being had to the accompanying drawings, and to the letters of reference marked thereon.

My invention relates to an improvement in crank-pins for driving-gear for self-feeding device of cut-nail machines; and consists in adjusting the crank or wrist pin with relation to the axis of the crank-disk through the medium of a right and a left threaded screw, the latter being furnished with a jam-nut.

To enable others skilled in the art to make and use my invention, I will proceed to describe more fully its construction and operation.

In the accompanying drawings, which form part of my specification, Figure 1 is a front or face view of my improvement in crank-pin for cut-nail machines. Fig. 2 is a side view of the same. Fig. 3 is a transverse section of the same at line *y* of Fig. 1. Fig. 4 is a side view of the same, representing two crank-pins and disks arranged on a shaft having driving-pulleys.

In the accompanying drawings, A represents the disk; B, the crank or wrist pin, on which is placed a sleeve, *g*, held in a fixed position by means of a screw-nut, *h*. The inner end of the wrist-pin B is provided with an opening having screw-threads fitted to screw-threads of the screw C, which is held in the disk A by means of the pin *f*, which is fitted in a groove in the end of the screw. The inner end of the screw C is coniformed and fitted to a cavity in the inner end of the screw D, which is furnished with a jam-nut, *e*. The screws C and D are provided with different kinds of screw-threads—that is to say, one has right-hand screw-threads and the other left-hand screw-threads. The crank or wrist pin B moves in a slot, K, in the face of the disk A, and the screws C and D are placed in a chamber or recess, *l*.

The disk A may be constructed in two parts by having the face B' detachable.

A' represents the shaft of the disk A, and is furnished with pulleys *m*.

My improvement in crank or wrist pins is susceptible of application to other machinery than that herein referred to; therefore I do not confine my improvement exclusively to cut-nail machines.

The operation of my improvement is as follows: In adjusting the crank or wrist pin B with relation to the axis of the disk A, the screw-nut *h* is unscrewed sufficiently to allow the screw C to turn easily in the opening in the pin, and the jam-nut *e* is unscrewed, so as to allow the screw D to turn easily. The operator turns the screw C, which will move the crank or wrist pin B out from or in toward the axis of the disk A, in accordance with the direction of the travel of the screw. When the pin B is moved to the point desired, the screw D is screwed against the end of the screw C, and the screw-nuts *h* and *e* tightened up, so as to hold the pin B and screws C and D in a fixed position.

The advantage of my improvement consists in enabling the operator of cut-nail machines to adjust with ease, facility, and certainty the crank-pin of the gear used in connection with the self-feeding device, such as described in Letters Patent granted me November 25, 1873, No. 144,845, and subsequently reissued.

Having thus described my improvement, what I claim as of my invention is—

The combination of the wrist-pin B, screws C D, jam-nut *e*, and disk A, constructed, arranged, and operating with relation to each other substantially as herein described, and for the purpose set forth.

WORCESTER HADDOCK.

Witnesses:
   JAMES J. JOHNSTON,
   A. C. JOHNSTON.